United States Patent
Shoobridge et al.

(10) Patent No.: US 6,326,926 B1
(45) Date of Patent: *Dec. 4, 2001

(54) METHOD OF OPERATING A WIRELESS AND A SHORT-RANGE WIRELESS CONNECTION IN THE SAME FREQUENCY

(75) Inventors: Richard Allen Shoobridge; J. Michael Rozmus, both of The Woodlands, TX (US)

(73) Assignee: Telxon Corporation, Holtsville, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/573,709

(22) Filed: May 18, 2000

(51) Int. Cl.[7] .................................................. H04Q 7/20
(52) U.S. Cl. ............................................. 343/702; 455/432
(58) Field of Search ............................ 343/702; 455/432, 455/428, 435, 422; 33/320; 370/486

(56) References Cited

U.S. PATENT DOCUMENTS

| | | | |
|---|---|---|---|
| 3,769,710 | * 11/1973 | Reister | 33/320 |
| 5,038,149 | 8/1991 | Aubry et al. | 342/372 |
| 5,945,960 | 8/1999 | Luh | 343/757 |
| 6,023,241 | 2/2000 | Clapper | 342/357.13 |
| 6,028,764 | 2/2000 | Richardson et al. | 361/681 |
| 6,031,502 | 2/2000 | Ramanujam et al. | 343/761 |
| 6,091,951 | * 7/2000 | Sturniolo et al. | 455/432 |

\* cited by examiner

Primary Examiner—Tho Phan
Assistant Examiner—James Clinger
(74) Attorney, Agent, or Firm—Amin & Turocy, LLP

(57) ABSTRACT

A system is provided having a first antenna arrangement tuned to communicate within a first radiation pattern and a second antenna arrangement tuned to communicate within a second radiation pattern. In a preferred aspect of the invention, the first radiation path has an inverted conical shape and the second radiation path has a disk shape. The first radiation path is employed to communicate to access points communicating according to the IEEE 802.11 standard and being located above tabletop level. The second radiation path is employed to communicate to access points communicating according to the Bluetooth standard and being located at or below tabletop level. A guard band separates the first radiation path from the second radiation path. The first and second antenna arrangement can be coupled to separate radio devices or can be coupled to the same radio device.

21 Claims, 7 Drawing Sheets

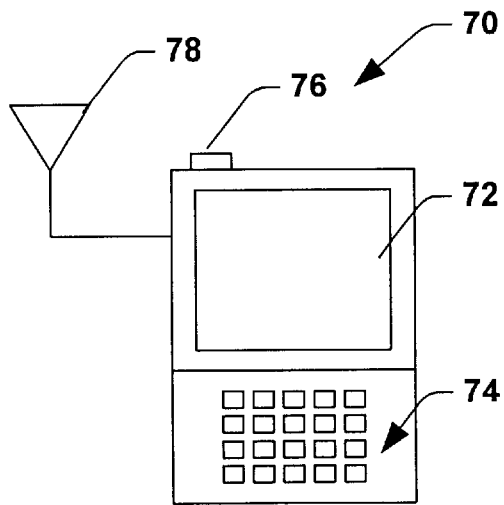
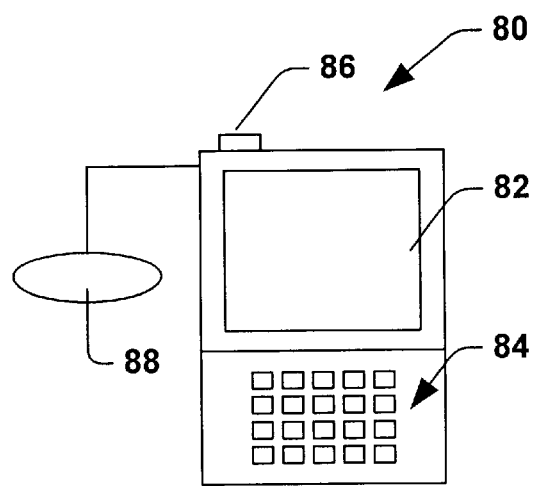
Fig. 4a  Fig. 4b
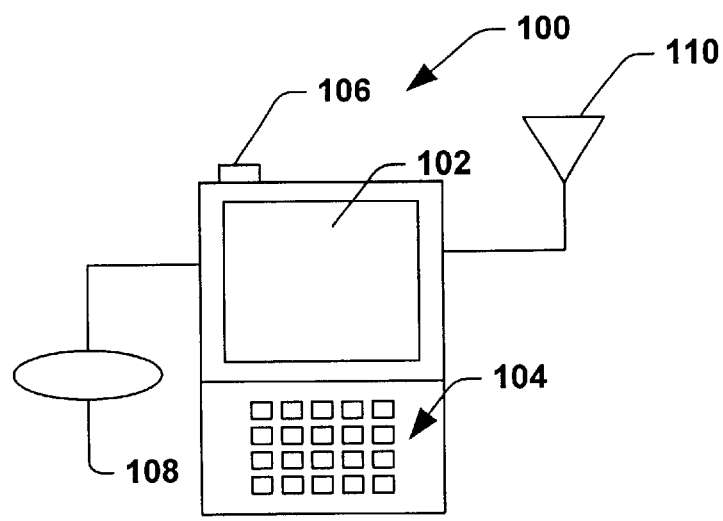
Fig. 5

METHOD OF OPERATING A WIRELESS AND A SHORT-RANGE WIRELESS CONNECTION IN THE SAME FREQUENCY

TECHNICAL FIELD

The present invention generally relates to communication systems, and in particular to a method of operating a wireless LAN and a short-range wireless connection in the same frequency range.

BACKGROUND OF THE INVENTION

The use of cellular communication systems having mobile devices which communicate with a hardwired network, such as a local area network (LAN) or a wide area network (WAN), has become widespread. Retail stores and warehouse, for example, may user cellular communications systems with mobile data terminals to track inventory and replenish stock. The transportation industry may use such systems at large outdoor storage facilities to keep an accurate account of incoming and outgoing shipments. In manufacturing facilities, such systems are useful for tracking parts, completed products and defects. Such systems are also utilized for cellular telephone communications to allow users with wireless telephones to roam across large geographical regions while retaining telephonic access. Paging networks also may utilize cellular communications systems which enable a user carrying a pocket sized pager to be paged anywhere within a geographic region.

A typical cellular communications system includes a number of fixed access points (also known as base stations) interconnected by a cable medium often referred to as a system backbone. Also included in many cellular communications systems are intermediate access points which are not directly connected to the system backbone but otherwise perform many of the same functions as the fixed access points. Intermediate access points, often referred to as wireless access points or base stations, increase the area within which access points connected to the system backbone can communicate with mobile devices.

Associated with each access point is a geographic cell. The cell is a geographic area in which an access point has sufficient signal strength to transmit data and receive data from a mobile device such as a data terminal or telephone with an acceptable error rate. Typically, access points will be positioned along the backbones such that the combined cell area coverage from each access point provides full coverage of a building or site.

Mobile devices such as telephones, pagers, personal digital assistants (PDA's), data terminals etc. are designed to be carried throughout the system from cell to cell. Each mobile device is capable of communicating with the system backbone via wireless communication between the mobile device and an access point to which the mobile device is registered. As the mobile device roams from one cell to another, the mobile device will typically deregister with the access point of the previous cell and register with the access point associated with the new cell. In order to provide sufficient cell area coverage, access points (or the antennas associated with each access point) within the cellular communications system typically are distributed at separate physical locations throughout an entire building or set of buildings.

Recently a standard for wireless local area networks (WLANs) known as the IEEE 802.11 standard has been adopted and has gained acceptance among the industrial, scientific and medical communities. The IEEE 802.11 standard for WLANs is a standard for systems that operate in the 2,400–2,483.5 MHz industrial, scientific and medical (ISM) band. The ISM band is available worldwide and allows unlicensed operation of spread spectrum systems. The IEEE 802.11 RF transmissions use multiple signaling schemes (modulations) at different data rates to deliver a single data packet between wireless systems. The latest IEEE 802.11 wireless LAN uses a band of frequencies near 2.4 Ghz for direct sequence spread spectrum transmissions. Another recently adopted short-range standard has evolved known as the Bluetooth standard (see www.bluetooth.com). The Bluetooth standard is a low-cost short range wireless connection which uses much of the same range of frequencies for its frequency-hopping spread spectrum transmissions as the IEEE 802.11 standard. In some applications, it is appropriate to use systems employing IEEE 802.11 concurrently with other systems using the Bluetooth standard. Consequently, there is expected to be considerable interference between the two systems. Early theoretical studies show widespread use of Bluetooth standard reducing the band-width of a co-located 802.11 LAN by as much as 20–50%. It is also possible for 802.11 transmissions to interfere with Bluetooth.

Schemes proposed for mitigating the interference of 802.11 and Bluetooth generally involve adding intelligence to the networks so that they will sense each other and avoid collisions as much as possible. This is workable but complicated. Such methods will slow initial deployment of IEEE 802.11 and Bluetooth together, and add to the cost of maintenance.

Accordingly, there is a strong need in the art for a system and method that overcomes the aforementioned problems.

SUMMARY OF THE INVENTION

In many 802.11 wireless LAN installations, the access points or base stations are placed high above communication terminals in order to maximize the coverage range of each access point and minimize the number of access points (AP's) required. The ceilings of warehouses and large retail stores are typical AP locations. On the other hand, communication terminals that use the Bluetooth standard to communicate are typically located at approximately tabletop level or at the height of the terminal communicating to the Bluetooth devices. Due to the locations of the AP's conforming to the IEEE 802.11 standard and the locations of the AP's conforming to the Bluetooth standard, the antennas for IEEE 802.11 and Bluetooth in a terminal (mobile or stationary) that communicates via either or both using IEEE 802.11 and Bluetooth may be designed with directional properties that minimize interference between the two systems.

The antenna for the 802.11 wireless LAN (WLAN) can have a pattern of radiation or sensitivity that is approximately in the shape of an inverted cone. The antenna for the Bluetooth connection can have a pattern of radiation or sensitivity that is approximately in the shape of a disk with a shallow cone-shaped depression in the top. With this antenna arrangement, Bluetooth enabled devices located in a given floorspace at about the same height will "see" each other for Bluetooth communication. But these Bluetooth links will not "see" interfering IEEE 802.11 transmissions. Similarly, IEEE 802.11 enabled devices will communicate with one another via the AP's above them. However, they will not "see" the interfering Bluetooth transmissions. 'It is to be appreciated that the two antenna radiation patterns may be used separately in any device or terminal, or they may be used together in the same device or terminal.

Maintaining the orientation of the antenna patterns with respect to the ground is straightforward when the terminal or device is stationary, but a mobile terminal presents a bit more problem. The antennas of a mobile device can be mounted in such a way as to track the orientation of the ground. This may be achieved by mounting the antenna in a double gimbal arrangement, suspending the antenna in a fluid, or perhaps, by control means. For example, by providing a ground tracking system coupled a control component, the orientation of the antenna can be maintained regardless of the orientation of the mobile terminal. However, if a mobile terminal is always held in approximately the same orientation with respect to the ground when it is operating, then special orientation mechanisms may not be necessary.

The present invention provides for a system and method for providing a first antenna arrangement tuned to communicate within a first radiation pattern and a second antenna arrangement tuned to communicate within a second radiation pattern. In a preferred aspect of the invention, the first radiation path has an inverted conical shape and the second radiation path has a disk shape. The first radiation path is employed to communicate to access points communicating according to the IEEE 802.11 standard and being located above a tabletop level. The second radiation path is employed to communicate to access points communicating according to the Bluetooth standard and being located at or below a tabletop level. A guard band separates the first radiation path from the second radiation path. The first and second antenna arrangement can be coupled to separate radio devices or can be coupled to the same radio device.

In accordance with one aspect of the invention, a radio system is provided for transmitting signals within a first wireless system located in a building and a second wireless system located in the building. The radio system comprises a first antenna system tuned to transmit and receive wireless communication within a first radiation pattern for communicating with the first wireless system and a second antenna system tuned to transmit and receive wireless communication within a second radiation pattern for communicating with the second wireless system.

Another aspect of the invention relates to a method of transmitting wireless communications within a building. The method comprises the steps of providing a first wireless system in the building having at least one access point located above tabletop level and providing a second wireless system in the building having at least one access point located at or below tabletop. The method also includes the steps of transmitting radio communications to the at least one access point of the first wireless system within a first radiation pattern and transmitting radio communications to the at least one access point of the second wireless system within a second radiation pattern.

Another aspect of the present invention relates to a radio system for transmitting signals within a first wireless system located in a building and a second wireless system located in the building. The radio system comprises means for communicating wirelessly within a first radiation pattern for communicating with the first wireless system and means for communicating wirelessly within a second radiation pattern for communicating with the second wireless system.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other advantages and novel features of the invention will become apparent from the following detailed description of the invention when considered in conjunction with the drawings.

BRIEF DESCRIPTION OF THE DRAWINGS

FIG. 4a illustrates a front view of a terminal having an antenna directed and tuned to communicate with access points above tabletop level in accordance with the present invention;

FIG. 4b illustrates a front view of a terminal having an antenna directed and tuned to communicate with access points at or below tabletop level in accordance with the present invention;

FIG. 5 illustrates a front view of a terminal having a first antenna directed and tuned to communicate with access points above tabletop level and a second antenna directed and tuned to communicate with access points at or below tabletop level in accordance with the present invention;

DETAILED DESCRIPTION OF THE INVENTION

The present invention will now be described with reference to the drawings. The present invention will be described with reference to a system and method for directing a first radiation pattern of a first system employing a first radio standard and for directing a radiation pattern of a second system employing a second radio standard. Preferably, the first system employs the IEEE 802.11 standard and the second system employs the Bluetooth standard. It is to be appreciated that by employing different antennas and antenna configurations or by tuning antennas differently, different radiation patterns can be provided. For example, antennas with different shapes such as loop, dipole, disk, biconical, discone have different radiation patterns. Additionally, by using reflectors in combination with multiple antenna configurations, radiation patterns can be tuned for different radiation patterns. It should be understood that the description of these aspects of the invention are merely illustrative and that they should not be taken in a limiting sense.

Figure 1:
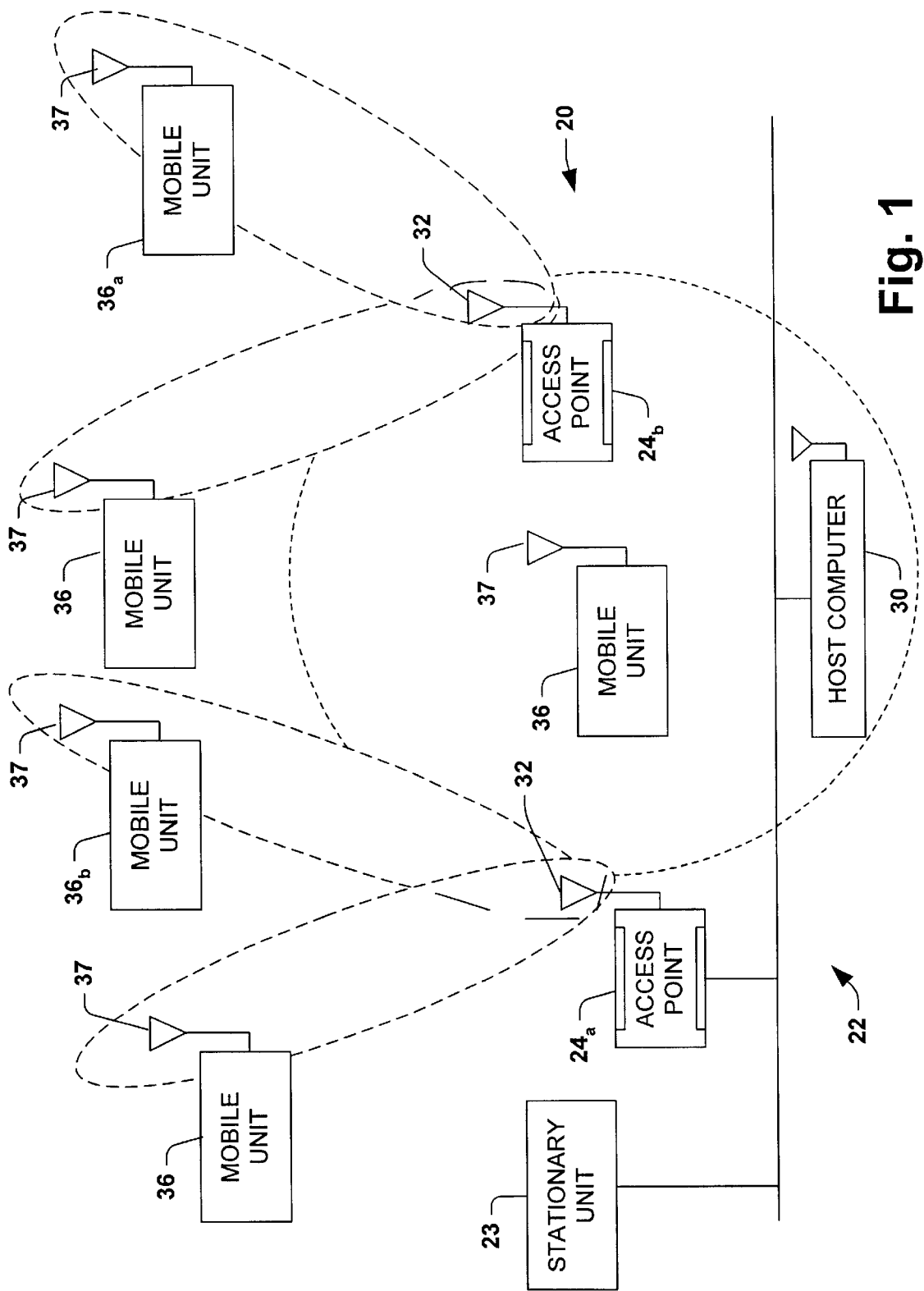
FIG. 1 illustrates a system diagram of a network communication system employing the IEEE 802.11 standard in accordance with the present invention.

Referring now to FIG. 1, a cellular communication system 20 employing the IEEE 802.11 standard is shown. The cellular communication system 20 includes a local area network (LAN) 22. The LAN or network backbone 22 may be a hardwired data communication path made of twisted pair cable, shielded coaxial cable or fiber optic cable, for example, or may be wireless or partially wireless in nature. Coupled to the LAN 22 are a stationary communication unit 23 and several access points 24. Only one access point 24$_a$ is shown hardwired to the network backbone 22, however, it is understood that more than one hardwired access points 24$_a$ may be physically connected to the network backbone 22. The access points 24 may be hardwired to the network 22 such as access point 24$_a$ or may be wirelessly coupled to the backbone 22 such as access point 24$_b$. Each access point serves as an entrance point through which wireless communications may occur with the network backbone 22. The wireless access point 24$_b$ may be employed to expand the effective communication range of the cellular communication system 20. As is conventional, each wireless access point 24$_b$ associates itself, typically by registration, with another access point or a host computer 30 coupled to the network backbone 22, whether hardwired or wireless, such that a link is formed between itself and other devices situated on the network backbone 22.

Each access point 24 is capable of wirelessly communicating with other devices in the communication system 20 via respective antennas commonly denoted by reference numeral 32. A geographic cell (not shown) associated with each access point 24 defines a region of coverage in which successful wireless communication may occur. Depending on the type of antenna 32 selected and output power of the respective access point, the geographic cell may take one of several different forms and sizes.

The cellular communication system 30 also includes one or more mobile communication units 36. The mobile communication units 36 each include an antenna 37 for wirelessly communicating with other devices. Preferably, the access points 24 are placed near the ceiling of a building and the antenna 37 has a radiation pattern of sensitivity in the shape of an inverted cone. This allows communication between the mobile communication unit 36 with the access points 24 to occur without interference of other systems having radiation patterns at or near ground level.

Each mobile communication unit 36 communicates with devices on the network backbone 22 via a selected access point 24 and/or with other mobile communication units, and/or directly with the host computer 30 if within cell range of the host computer 30. Upon roaming from one cell to another, the mobile communication unit 36 is configured to associate itself with a new access point 24 or directly with the host computer 30 if within range. A mobile communication unit 36 registers with a particular access point which provides the particular mobile communications unit with wireless access to the network backbone 22. Typically, access points 24 and mobile units 36 in different cells can communicate with each other during the same time period, such that simultaneous communication is occurring in system 20. The system 20 may conform to the IEEE standard 802.11 "Direct Sequence Spread Spectrum Physical Layer Specification". Alternatively, the system 20 may be employed utilizing the IEEE standard 802.11 "Frequency Hopping Spread Spectrum Physical Layer Specification" or any other protocol transmitting portions of packets at varying modulations and data rates.

Figure 2:
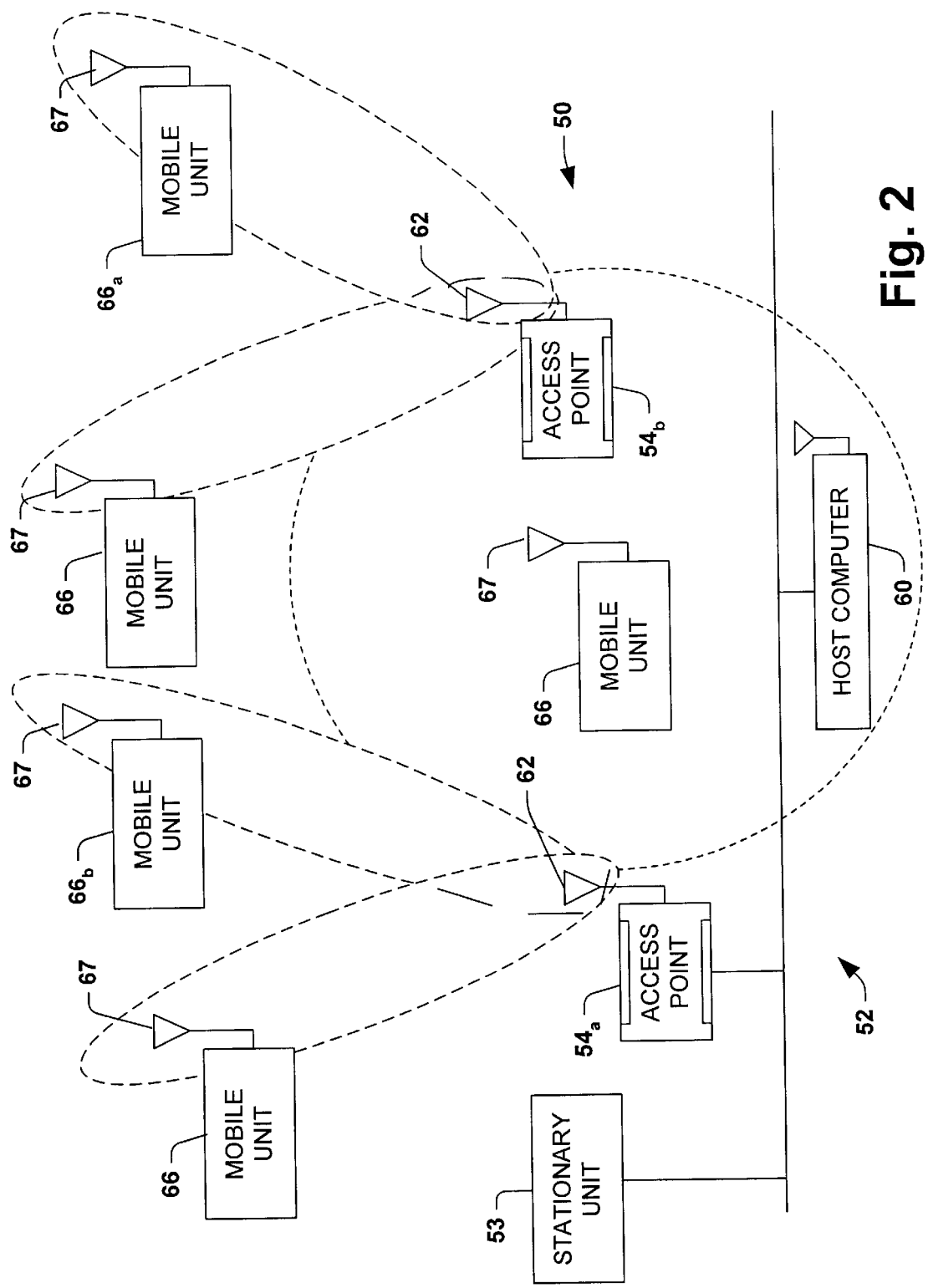
FIG. 2 illustrates a system diagram of a network communication system employing the Bluetooth standard in accordance with the present invention.

Referring now to FIG. 2, a cellular communication system 50 employing the Bluetooth standard is shown. The cellular communication system 50 includes a local area network (LAN) 52. The LAN or network backbone 52 may be a hardwired data communication path made of twisted pair cable, shielded coaxial cable or fiber optic cable, for example, or may be wireless or partially wireless in nature. Coupled to the LAN 52 are a stationary communication unit 53 and several access points 54. Only one access point 54$_a$ is shown hardwired to the network backbone 52, however, it is understood that more than one hardwired access points 54$_a$ may be physically connected to the network backbone 52. The access points 54 may be hardwired to the network 52 such as access point 54$_a$ or may be wirelessly coupled to the backbone 52 such as access point 54$_b$. Each access point serves as an entrance point through which wireless communications may occur with the network backbone 52. The wireless access point 54$_b$ may be employed to expand the effective communication range of the cellular communication system 50. As is conventional, each wireless access point 54$_b$ associates itself, typically by registration, with another access point or a host computer 60 coupled to the network backbone 52, whether hardwired or wireless, such that a link is formed between itself and other devices situated on the network backbone 52.

Each access point 54 is capable of wirelessly communicating with other devices in the communication system 50 via respective antennas commonly denoted by reference numeral 52. A geographic cell (not shown) associated with each access point 54 defines a region of coverage in which successful wireless communication may occur. Depending on the type of antenna 62 selected and output power of the respective access point, the geographic cell may take one of several different forms and sizes.

The cellular communication system 50 also includes one or more mobile communication units 66. The mobile communication units 66 each include an antenna 67 for wirelessly communicating with other devices. For example, the antenna 67 could be a directed discone type antenna for a more directed vertical electrical field over a ground plane. Preferably, the access points 54 are placed at tabletop level of a building and the antenna 67 has a radiation pattern of sensitivity in the shape of disk with a shallow cone-shaped depression. This allows communication between the mobile communication unit 66 with the access points 54 to occur without interference of other systems having radiation patterns above tabletop level.

Each mobile communication unit 66 communicates with devices on the network backbone 52 via a selected access point 54 and/or with other mobile communication units, and/or directly with the host computer 60 if within cell range of the host computer 30. Upon roaming from one cell to another, the mobile communication unit 66 is configured to associate itself with a new access point 54 or directly with the host computer 60 if within range. A mobile communication unit 66 registers with a particular access point which provides the particular mobile communications unit with wireless access to the network backbone 52. Typically, access points 54 and mobile units 66 in different cells can communicate with each other during the same time period, such that simultaneous communication is occurring in system 50.

Figure 3:
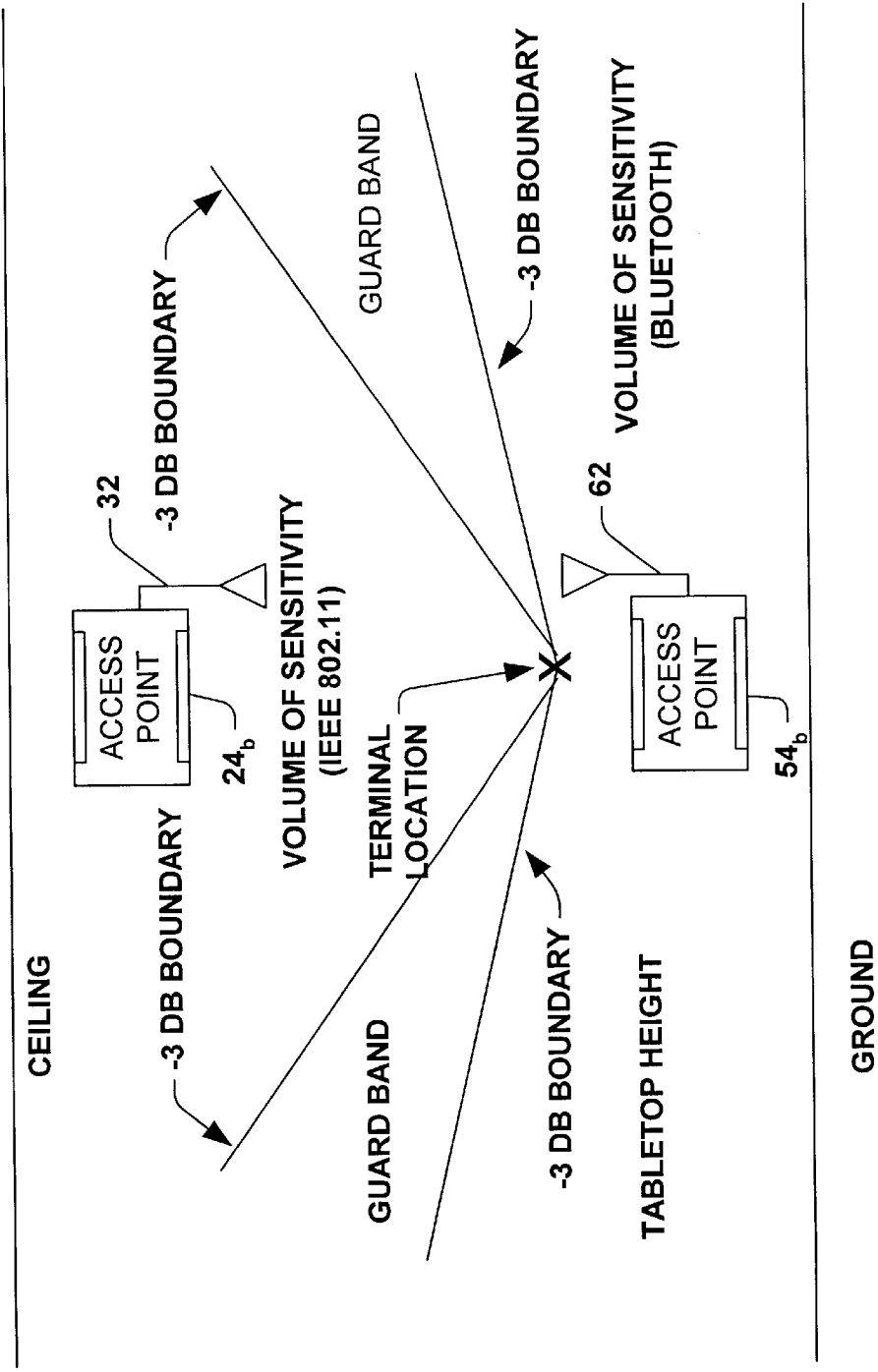
FIG. 3 illustrates a front view of two radiation patterns in accordance with the present invention.

FIG. 3 illustrates a front view of the two radiation patterns of the mobile units 36 and 66 employing the IEEE 802.11 standard and the Bluetooth standard, respectively. The access points 24$_b$ and 54$_b$ reside in different radiation patterns. A terminal transmitting one or both of the radiation patterns resides in a central location depicted by an X. As can be seen from FIG. 3, the access point 54$_b$ resides in a radiation pattern employing the Bluetooth standard and having a volume of sensitivity in the shape of disk with a shallow cone-shaped depression, while the access point 24$_b$ resides in a radiation pattern employing the IEEE 802.11 standard and having a volume of sensitivity in the shape of an inverted cone. The two volumes of sensitivity are defined by −3 DB boundary lines and separated by a guard bands. The access point 24$_b$ is above tabletop height near the ceiling, while the access point 54$_b$ is below tabletop height near the ground.

FIG. 4a illustrates a stationary terminal 70 having an antenna 78 directed upwardly. The antenna 78 is tuned or has a shape adapted to provide an inverse conical radiation pattern to communicate with access point systems adhering to the IEEE 802.11 that are located on or near a ceiling in a building. The stationary terminal 70 also includes a display 72, a keyboard 74 and a data communication port 76. FIG. 4b illustrates a stationary terminal 80 having an antenna 88 directed downwardly. The antenna 88 is tuned or has a shape adapted to provide a disk shaped radiation pattern to communicate with access point systems adhering to the Bluetooth standard located on or near a floor in the building. The stationary terminal 80 also includes a display 82, a keyboard 84 and a data communication port 86.

It is to be appreciated that a single hand held terminal can be employed to communicate to both access points employing the IEEE 802.11 standard and the Bluetooth standard. FIG. 5 illustrates a hand held portable device or hand held terminal 100 having a first antenna directed upwardly 110 and a second antenna 108 directed downwardly. The antenna 110 is tuned or has a shape adapted to provide an inverse conical radiation pattern to communicate with access point systems adhering to the IEEE 802.11 that are located above tabletop level in a building. The antenna 108 is tuned or has a shape adapted to provide a disk shaped radiation pattern to communicate with access point systems adhering to the Bluetooth standard located at or below tabletop level in the building. Since hand held terminal 100 is a mobile terminal its orientation is not always directed vertically with respect to the ground. However, a ground tracking terminal and antenna direction control systems may be employed to control the orientation of the antenna 110 and the antenna 108.

Figure 6:
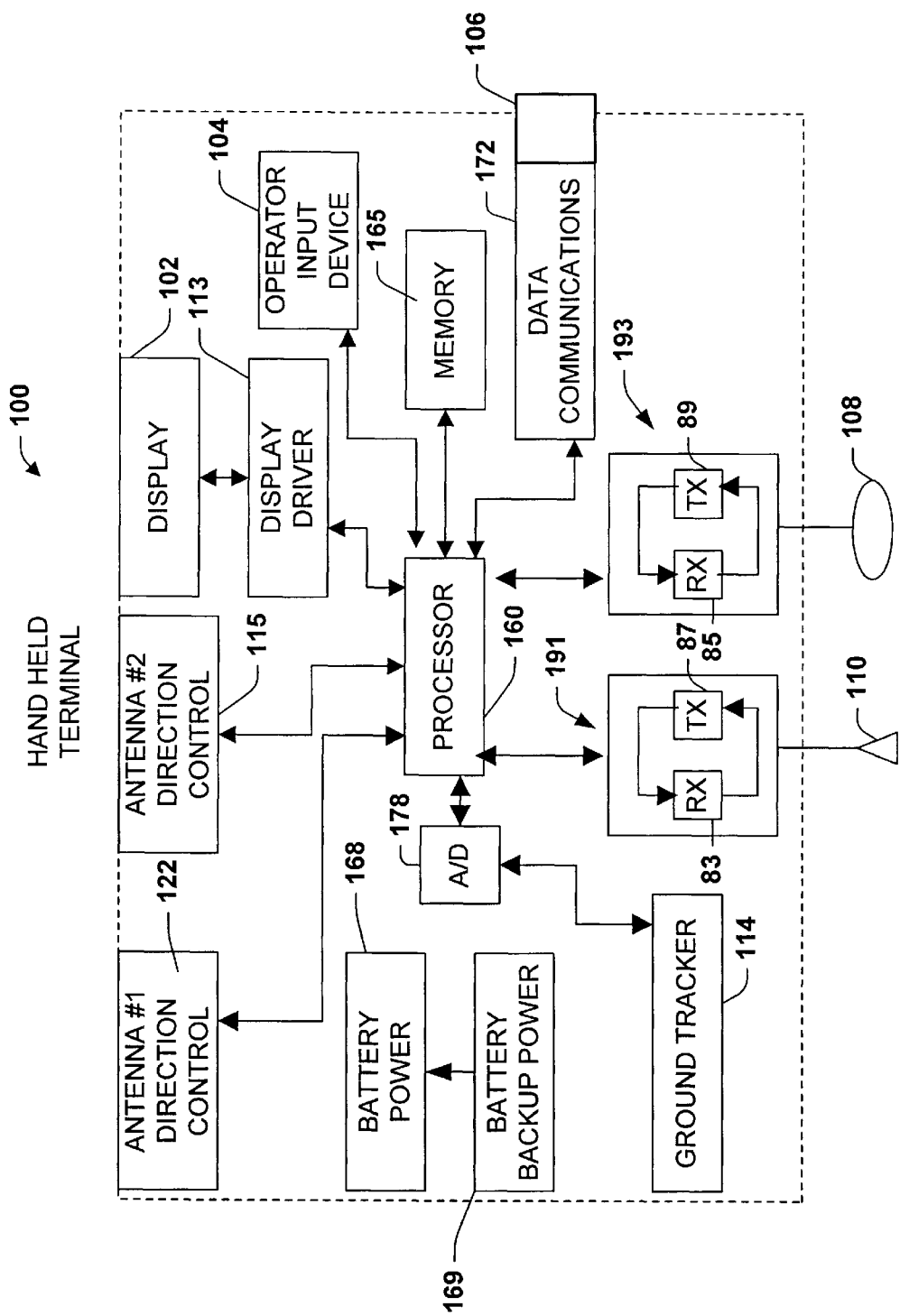
FIG. 6 illustrates a detailed block schematic diagram of the terminal of FIG. 5 in accordance with the present invention.

Referring now to FIG. 6, a schematic representation of the hand held portable device 100 is shown according to one particular aspect of the present invention, wherein a processor 160 is responsible for controlling the general operation of the hand held portable device 100. The processor 160 is programmed to control and operate the various components within the hand held portable device 100 in order to carry out the various functions described herein. The processor or CPU 160 can be any of a plurality of processors, such as the p24T, Pentium 50/75, Pentium 60/90, and Pentium 66/100, Pentium PRO and Pentium 2, and other similar and compatible processors or micro controllers. A processor such as Intel's 8 bit microcontrollers, the 8031, 8051 or 8052 can be utilized. The manner in which the processor 160 can be programmed to carry out the functions relating to the present invention will be readily apparent to those having ordinary skill in the art.

A memory 165 tied to the processor 160 is also included in the hand held portable device 100 and serves to store program code executed by the processor 160 for carrying out operating functions of the hand held portable device 100 as described herein. The memory 165 also serves as a storage medium for temporarily storing information such as receipt transaction information and the like. The memory 165 is adapted to store a complete set of the information to be displayed. According to a preferred embodiment, the memory 165 has sufficient capacity to store multiple sets of information, and the processor 160 could include a program for alternating or cycling between various sets of display information. This feature enables the display 102 to show a variety of effects conducive for quickly conveying product and customer information to a user.

The display 102 is coupled to the processor 160 via a display driver system 1I13. The display 102 may be a liquid crystal display (LCD) or the like. In the preferred embodiment, the display 102 is a fine pitch liquid crystal display operated as a standard CGA display with a resolution of 640×200 pixels. The display 102 functions to display data or other information relating to ordinary operation of the hand held portable device 100. For example, the display 102 may display location information of access points which is displayed to the operator and may be transmitted over a system backbone (not shown). Additionally, the display 102 may display a variety of functions that control the execution of the hand held portable device 100. The display 102 is capable of displaying both alphanumeric and graphical characters.

Power is provided to the processor 160 and other components forming the hand held portable device 100 by a battery power module 168. The hand held portable device 100 is protected by battery power failure by a battery backup power module 169. Typically, the battery backup module 169 is a much smaller battery than the battery module 168 and invoked only during swapping of the battery module 168 or a battery module failure. Preferably, the hand held portable device 100 will enter a minimum current draw or sleep mode upon detection of the battery power module failure.

The hand held terminal 100 includes a communication subsystem 172 which includes the data communication port 106, which is employed to interface the processor 160 with a host computer. The hand held portable device includes a first RF section 191 connected to the processor 160 for transmitting and receiving data from access points employing the IEEE 802.11 standard. The RF section 191 includes an RF receiver 83 which receives RF transmissions from an access point for example via the antenna 110 and demodulates the signal to obtain digital information modulated therein. The RF section 191 also includes an RF transmitter 87 for transmitting information to the access point, for example, in response to an operator input at keypad 104 or the receipt of a registration request. The hand held portable device also includes a second RF section 193 connected to the processor 160 for transmitting and receiving data from access points employing the Bluetooth standard. The RF section 193 includes an RF receiver 85 which receives RF transmissions from an access point for example via the antenna 108 and demodulates the signal to obtain digital information modulated therein. The RF section 193 also includes an RF transmitter 89 for transmitting information to the access points, for example, in response to an operator input at keypad 104 or the receipt of a registration request.

The hand held terminal 100 includes a ground tracker 114 for providing ground tracking information with respect to the hand held terminal 100 to the processor 160 via the A/D converter 178. The ground tracking information is used by the processor 160 in providing ground location information to an antenna #1 direction control component 122 and to an antenna #2 direction control component 115. The antenna #1 direction control component 122 ensures that the antenna 110 is directed upward with respect to the ground regardless of the orientation of the hand held terminal 100. The antenna #1 direction control component 115 ensures that the antenna 108 is directed downward with respect to the ground regardless of the orientation of the hand held terminal 100. It is to be appreciated that the orientation of the antenna 108 and 110 is dependent on the type and shape of the antenna configuration being employed to obtain the desired radiation patterns. The direction control components 115 and 122 can be a double gimbal arrangement making it unnecessary to employ the ground tacker 114.

Figure 7:
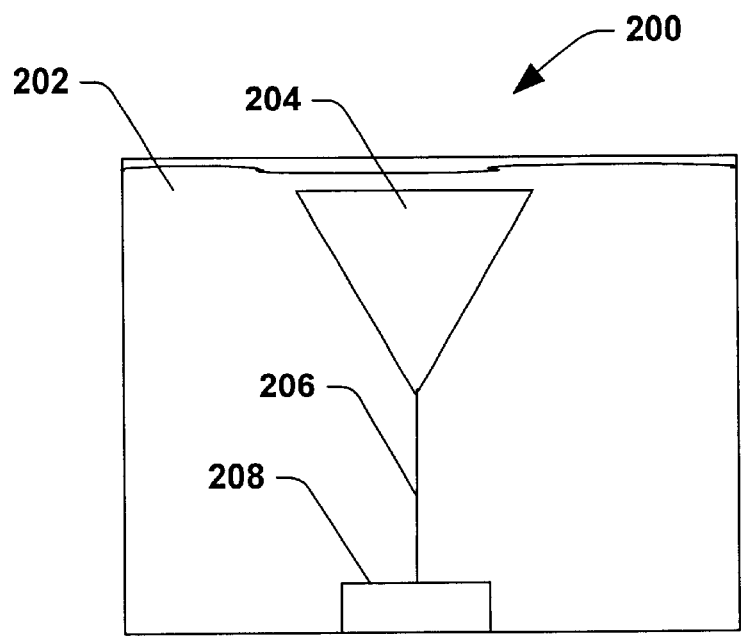
FIG. 7 illustrates a front view of an antenna enclosed in a container filled with liquid that is more dense than the antenna in accordance with the present invention.
Figure 8:
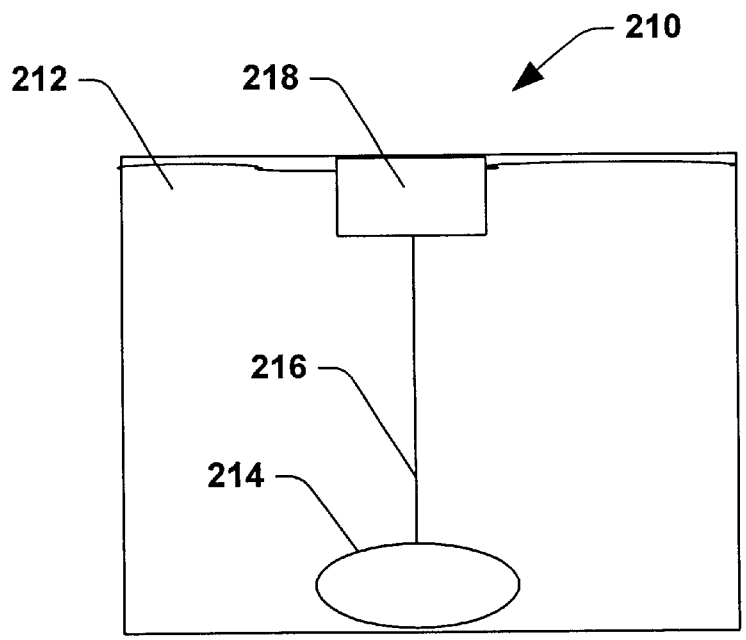
FIG. 8 illustrates a front view of an antenna enclosed in a container filled with liquid that is less dense than the antenna in accordance with the present invention.

It is to be appreciated that direction of antennas can be controlled in alternative manners. FIG. 7 illustrates a container 200 including an antenna 204 submersed in a liquid 202. The antenna 204 is coupled to a connector 208 at the bottom of the container 200 via a connecting line 206. The antenna 204 has a density that is less than the density of the liquid 202, such that the antenna 204 always floats upwardly regardless of the orientation of the container 200. FIG. 8 illustrates a container 210 including an antenna 214 submersed in a liquid 212. The antenna 214 is coupled to a connector 218 at the top of the container 210 via a connecting line 216. The antenna 214 has a density that is greater than the density of the liquid 212, such that the antenna 214 always floats downwardly regardless of the orientation of the container 210.

Figure 9:
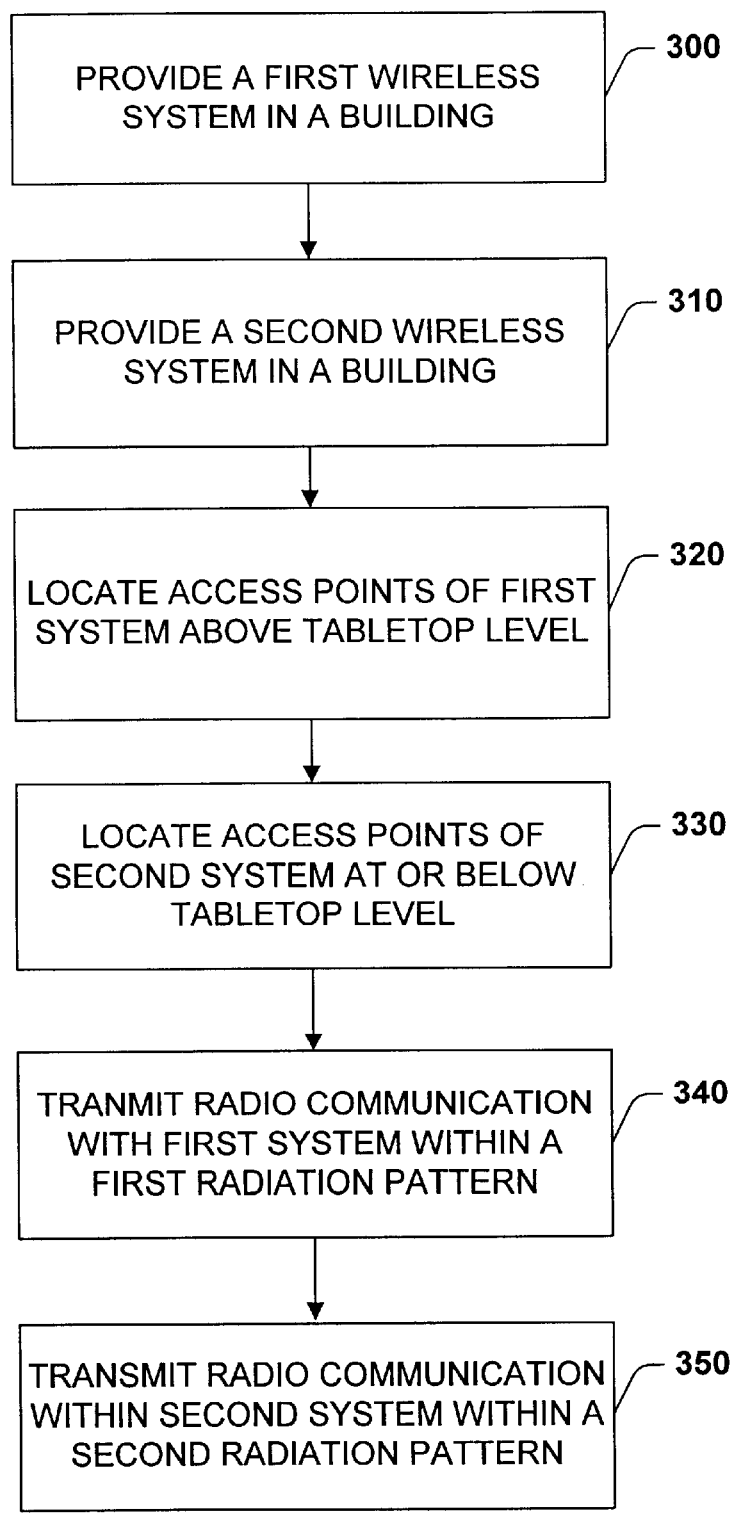
FIG. 9 is a flow diagram illustrating a methodology for wireless communication in accordance with the present invention.

FIG. 9 is a flow diagram illustrating one particular methodology for providing wireless communication of two wireless communication systems transmitting at similar frequencies within the same building according to the present invention. In step 300, a first wireless system is provided in a building. In step 310, a second wireless system is provided in the building. Access points of the first system are located above tabletop level in step 320. In step 330, access points of the second system are located at or below tabletop level. Radio communications within the first wireless system are transmitted within a first radiation pattern in step 340. In step 350, radio communications within the second wireless system are transmitted within a second radiation pattern.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A radio system for transmitting signals within a first wireless system located in a building and a second wireless system located in the building, the radio system comprising:
   a first antenna system tuned to transmit and receive wireless communication within a first radiation pattern for communicating with the first wireless system; and
   a second antenna system tuned to transmit and receive wireless communication within a second radiation pattern for communicating with the second wireless system, the first and second radiation patterns being spatially separated from one another to mitigate interference between the first and second radiation patterns.

2. The system of claim 1, the first antenna system being coupled to a first radio device and the second antenna system being coupled to a second radio device.

3. The system of claim 1, the first antenna system and the second antenna system being coupled to a single radio device.

4. The system of claim 1, the first wireless system including at least one access point located at a first level and the second wireless system including at least one access point located at or below the first level.

5. The system of claim 4, the first radiation pattern having an inverted conical shape and the second radiation pattern having a disk shape wherein the first radiation pattern is located above the second radiation pattern in the building.

6. The system of claim 5, the first wireless system communicating utilizing multiple signaling schemes at different data rates to deliver a single data packet over a direct sequence spread spectrum and the second wireless system communicating according to the Bluetooth standard.

7. The system of claim 1, wherein the first wireless system and the second wireless system communicate within the same general frequency.

8. The system of claim 1, at least one of the first antenna system and the second antenna system being coupled to a mobile device including an antenna direction control component adapted to adjust the orientation of the antenna so as to maintain its respective radiation pattern regardless of the orientation of the mobile device.

9. The system of claim 8, further including a ground tracker system adapted to determine the orientation of the mobile device and transmit this information to the antenna direction control component for adjustment of the orientation of the antenna.

10. The system of claim 8, the antenna direction control component being a double gimbal assembly.

11. The system of claim 8, the antenna direction control component being a container of liquid wherein the antenna is submerged in the container of liquid and floats to one of the top and bottom of the liquid depending on the density of the liquid and the density of the antenna.

12. A method of transmitting wireless communications within a building comprising the steps of:
   providing a first wireless system in the building having at least one access point located at a first level;
   providing a second wireless system in the building having at least one access point located at or below the first level;
   transmitting radio communications to the at least one access point of the first wireless system within a first radiation pattern; and
   transmitting radio communications to the at least one access point of the second wireless system within a second radiation pattern, the first and second radiation patterns being spatially separated from one another to mitigate interference between the first and second pattern.

13. The method of claim 12, the first radiation pattern having an inverted conical shape and the second radiation pattern having a disk shape wherein the first radiation pattern is located above the second radiation pattern.

14. The method of claim 13, the first radiation pattern and the second radiation pattern being separated by a guard band.

15. The method of claim 12, the first wireless system transmitting communication utilizing multiple signaling schemes at different data rates to deliver a single data packet over a direct sequence spread spectrum and the second wireless system transmitting communications according to a Bluetooth standard.

16. The method of claim 12, wherein the step of transmitting radio communications to the at least one access point of the first wireless system at a first radiation pattern includes providing a radio system with an antenna having a first shape and the step of transmitting radio communications to the at least one access point of the second wireless system at a second radiation pattern includes providing a radio system with an antenna having a second shape.

17. The method of claim 12, wherein the step of transmitting radio communications to the at least one access point of the first wireless system at a first radiation pattern includes providing a radio system with an antenna tuned to transmit radio communications according to the first radiation pattern and the step of transmitting radio communications to the at least one access point of the second wireless system at a second radiation pattern includes providing a radio system tuned to transmit radio communications according to the second radiation pattern.

18. A radio system for transmitting signals within a first wireless system located in a building and a second wireless system located in the building, the radio system comprising:
   means for communicating wirelessly within a first radiation pattern for communicating with the first wireless system;
   means for communicating wirelessly within a second radiation pattern for communicating with the second wireless system; and
   means for mitigating interference between the first and second radiation pattern, the first and second radiation patterns being spatially separated from one another.

19. The system of claim 18, further including means for maintaining the orientation of the means for communicating wirelessly within a first radiation pattern.

20. The system of claim 19, further including means for tracking the ground location being adapted to provide the means for maintaining the orientation of the means for communicating wirelessly within a first radiation pattern with ground location information.

21. A system for transmitting wireless communications within a building comprising:
   a first wireless system in the building having at least one access point located at a first level;
   a second wireless system in the building having at least one access point located at a second level, the first level being located above the second level;
   a first radiation pattern to transmit radio communications to the at least one access point of the first wireless system, the first radiation pattern having an inverted conical shape;
   a second radiation pattern to transmit radio communications to the at least one access point of the second wireless system, the second radiation pattern having a disk shape, the first radiation pattern being spatially located above the second radiation pattern; and
   a guard band to separate the first radiation pattern from the second radiation pattern to avoid interference between the first and second radiation patterns.

* * * * *